United States Patent Office 3,207,790
Patented Sept. 21, 1965

3,207,790
PROCESS FOR REDUCING THE COLOR OF
DISCOLORED ALKANOLAMINES
David Neville Glew and David Matheson Young, Sarnia, Ontario, Canada, assignors to The Dow Chemical Company, Midland, Mich., a corporation of Delaware
No Drawing. Filed July 6, 1961, Ser. No. 122,118
9 Claims. (Cl. 260—584)

This invention relates to a process for substantially reducing the color of alkanolamines.

Alkanolamines are conventionally prepared by reacting an alkylene oxide with ammonia or an amine, and it is to be understood that the process of the present invention is confined to those alkanolamines so prepared.

Alkanolamines, when freshly prepared, are water-white or very nearly water-white liquids. However, it has been found that upon standing for some length of time they will darken to a yellow or yellow-green color. This darkening occurs regardless of whether or not the alkanolamine is exposed to daylight or sunlight and regardless of whether or not it is sealed from the atmosphere. The darkening of the alkanolamine is objectionable in many instances, depending upon the end-use of a particular alkanolamine. Triethanolamine, for example, is used extensively in the cosmetic market and thus must be largely color-free to be commercially acceptable.

It is therefore an object of the present invention to provide a method for substantially reducing the color of alkanolamines. It has now been found that the color of alkanolamines is substantially reduced by adding to the alkanolamine an amount, sufficient to effect substantial reduction in color, of a borohydride of an alkali metal.

It is preferred that the borohydride be added in the proportions of from about 0.01 percent to about 1 percent, based on the weight of the alkanolamine. However, it is to be understood that the amount to be added is dependent upon the extent of the coloration, and therefore in the broadest aspect of the invention, sufficient borohydride must be added to effect substantial color reduction, whatever its extent.

The borohydrides disclosed herein as elements of the novel process have appreciable solubility in the alkanolamines and are easily dissolved therein, normally by gentle stirring for a short period of time.

After dissolution of the borohydride, the alkanolamine may be distilled if desired for a particular end-use, or the alakanolamine containing the borohydride may be used as such. It has been found, for example, that a quantity of badly discolored 2-(dimethylamino)ethanol was decolorized to a very nearly water-white by adding an alkali metal borohydride and then distilling the material under reduced pressure.

The reduction in color produced by the addition of the borohydride is maintained indefinitely under normal conditions. It has been found that alkanolamines treated by this method have remained decolorized for as long as one year.

The practice of the present invention is illustrated by the following examples.

EXAMPLE I

To 500 pounds of commercial grade triethanolamine in a phosphatized steel drum was added 0.02 percent by weight of potassium borohydride. The borohydride was dissolved by continual stirring which was maintained for several hours. Air was excluded by maintaining the contents of the drum under a nitrogen blanket. The contents of the drum were sampled and the samples analyzed for color intensity before the addition of the borohydride and at intervals, after the addition, for as long as four months. There are shown in Table I the APHA color readings for all samples analyzed.

Table I

APHA color
TEA without borohydride _____ 60
TEA immediately after addition of borohydride __ 40
TEA after:
   1 week _____ 35
   1 month _____ 40
   4 months _____ 40

EXAMPLE II

Samples of commercial grades of diethanolamine and triethanolamine were each analyzed for color intensity and then each was treated with 0.1 weight percent of sodium borohydride and agitated for 2 hours at room temperature until the samples were clear. The samples were then stored in clear glass bottles on a shelf exposed to daylight. The color of each sample was then determined at intervals during the storage period. There are shown in Table II the APHA colors determined for each sample at the noted time interval.

Table II

[APHA Color]

|  | DEA | TEA |
|---|---|---|
| Without borohydride | 35 | 100 |
| Immediately after addition of borohydride | 30 | 60 |
| After: |  |  |
| 3 weeks |  | 50 |
| 1 month | 25 |  |
| 6 weeks |  | 35 |
| 6 months | 20 |  |

Similar decolorization of diethanolamine was obtained by employing an equal proportion of potassium borohydride under similar conditions.

In addition to the alkanolamines disclosed in the examples, other alkanolamines, and dialkylalkanolamines and alkyldialkanolamines, such as monoethanolamine, mono-, di- and tri-isopropanolamine, N,N-diethyl ethanolamine, N,N-dibutyl ethanolamine, N-methyl diethylanolamine and N-ethyl diethanolamine, may be similarly treated and a reduction in their color effected.

We claim:
1. A process for improving the color of alkanolamines that develop undesirable color on aging said process comprising adding to said alkanolamine a quantity, sufficient to substantially reduce the color of the alkanolamine, of a borohydride of an alkali metal.
2. A process as in claim 1 wherein the alkanolamine is an ethanolamine.
3. A process as in claim 1 wherein the alkanolamine is an isopropanolamine.
4. A process as in claim 2 wherein the ethanolamine is 2-(dimethylamino)ethanol.

5. A process as in claim 2 wherein the ethanolamine is diethanolamine.

6. A process as in claim 2 wherein the ethanolamine is triethanolamine.

7. A process as in claim 1 wherein the borohydride is added in the proportions of from about 0.01 percent to about 1 percent, based on the weight of the alkanolamine.

8. A process as in claim 1 wherein the borohydride is sodium borohydride.

9. A process as in claim 1 wherein the borohydride is potassium borohydride.

References Cited by the Examiner

UNITED STATES PATENTS 2,957,023 10/60 Dimler et al. _____ 260—475

FOREIGN PATENTS 610,655 12/60 Canada.
611,510 12/60 Canada.

CHARLES B. PARKER, *Primary Examiner*.

LEON ZITVER, JOSEPH P. BRUST, *Examiners*.